United States Patent
McIntyre et al.

(10) Patent No.: US 10,220,660 B2
(45) Date of Patent: Mar. 5, 2019

(54) APPARATUS, SYSTEM AND METHOD FOR CONFIGURING A TIRE INFORMATION SENSOR WITH A TRANSMISSION PROTOCOL BASED ON VEHICLE TRIGGER CHARACTERISTICS

(71) Applicant: Continental Automotive Systems, Inc., Auburn Hills, MI (US)

(72) Inventors: Matthew D. McIntyre, New Baltimore, MI (US); Jean-Christophe Deniau, Fenton, MI (US); Brian Farrell, Troy, MI (US); Yasser Gad, Macomb, MI (US); Dhivya Vijayan, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/225,470

(22) Filed: Aug. 1, 2016

(65) Prior Publication Data
US 2017/0036499 A1 Feb. 9, 2017

Related U.S. Application Data

(60) Provisional application No. 62/200,528, filed on Aug. 3, 2015.

(51) Int. Cl.
*B60C 23/04* (2006.01)
*H04L 29/08* (2006.01)
*H04W 4/80* (2018.01)

(52) U.S. Cl.
CPC ...... *B60C 23/0462* (2013.01); *B60C 23/0442* (2013.01); *B60C 23/0461* (2013.01); *B60C 23/0471* (2013.01); *H04L 67/12* (2013.01); *H04W 4/80* (2018.02)

(58) Field of Classification Search
USPC ........................................ 340/447, 445, 442
See application file for complete search history.

(56) References Cited

U.S. PATENT DOCUMENTS

| 2,428,089 | A | 9/1947 | Mumma et al. |
| 2,451,859 | A | 10/1948 | Mumma et al. |
| 3,777,062 | A | 12/1973 | Ogawa |
| 3,814,839 | A | 6/1974 | Lubarsky et al. |

(Continued)

FOREIGN PATENT DOCUMENTS

| CN | 1521027 A | 8/2004 |
| CN | 103503353 A | 1/2014 |

(Continued)

OTHER PUBLICATIONS

"Sony Remote Commander Operating Instructions RM-V701/V801", 1998, Sony Corporation.

(Continued)

*Primary Examiner* — Brent Swarthout

(57) ABSTRACT

In a vehicle tire pressure sensor, a wireless, low frequency (LF) receiver identifies a particular type of signal protocol that was used to form a first message that is sent to the sensor by the vehicle. Using the identification of the protocol used to form the first message, the sensor determines a type of signal protocol to be used to transmit information to the vehicle, such as an identifier for the tire pressure sensor in a second message.

6 Claims, 9 Drawing Sheets

(56) References Cited

U.S. PATENT DOCUMENTS

| | | | |
|---|---|---|---|
| 3,814,840 A | 6/1974 | Lubarsky et al. |
| 4,589,063 A | 5/1986 | Shah et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,434,572 A | 7/1995 | Smith |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,732,283 A | 3/1998 | Rose et al. |
| 5,741,966 A | 4/1998 | Handfield et al. |
| 5,768,499 A | 6/1998 | Treadway et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,141,792 A | 10/2000 | Acker et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekerk et al. |
| 6,469,621 B1 * | 10/2002 | Vredevoogd et al. ........ 340/445 |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Berghoff et al. |
| 6,693,522 B2 | 2/2004 | Tang et al. |
| 6,704,364 B1 | 3/2004 | Lim et al. |
| 6,705,155 B2 | 3/2004 | Katou |
| 6,710,708 B2 | 3/2004 | McClelland et al. |
| 6,731,205 B2 | 5/2004 | Schofield et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,802,213 B1 | 10/2004 | Agrotis |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |

(56) References Cited

U.S. PATENT DOCUMENTS

| | | |
|---|---|---|
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,318,162 B2 | 1/2008 | Rineer et al. |
| 7,369,491 B1 | 5/2008 | Beshai et al. |
| 7,380,450 B2 | 6/2008 | Durif |
| 7,382,239 B2 | 6/2008 | Song et al. |
| 7,414,523 B2 | 8/2008 | Li et al. |
| 7,453,350 B2 | 11/2008 | Kachouh et al. |
| 7,478,554 B2 | 1/2009 | Roth et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,642,904 B2 | 1/2010 | Crano |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,900,198 B2 | 3/2011 | Kasman |
| 7,948,364 B2 | 5/2011 | Lin et al. |
| 8,013,725 B2 | 9/2011 | Murata et al. |
| 8,015,864 B2 | 9/2011 | Petrucelli |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 8,576,060 B2 | 11/2013 | Deniau et al. |
| 9,259,980 B2 | 2/2016 | Deniau et al. |
| 9,381,777 B2* | 7/2016 | Yu et al. ............ 340/442 |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0087250 A1 | 7/2002 | Pacsai |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0030553 A1 | 2/2003 | Schofield et al. |
| 2003/0050070 A1 | 3/2003 | Mashinsky et al. |
| 2003/0071723 A1 | 4/2003 | Tang et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0122660 A1 | 7/2003 | Kachouh et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0197604 A1 | 10/2003 | Ogawa et al. |
| 2003/0201783 A1 | 10/2003 | Steber et al. |
| 2003/0228879 A1 | 12/2003 | Witkowski |
| 2004/0027241 A1 | 2/2004 | Forster |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0024194 A1 | 2/2005 | Ide |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1* | 5/2005 | Tang ............... B60C 23/0408 340/445 |
| 2005/0132792 A1 | 6/2005 | Lemense et al. |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0152342 A1 | 7/2006 | Turner et al. |
| 2006/0161327 A1 | 7/2006 | Emmerich et al. |
| 2006/0187014 A1 | 8/2006 | Li et al. |
| 2006/0192661 A1 | 8/2006 | Geradiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2006/0277989 A1 | 12/2006 | Lee et al. |
| 2007/0063814 A1 | 3/2007 | Olson et al. |
| 2007/0069947 A1 | 3/2007 | Banet et al. |
| 2007/0090936 A1 | 4/2007 | Nornes |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |

(56) References Cited

U.S. PATENT DOCUMENTS

| | | |
|---|---|---|
| 2007/0213951 A1 | 9/2007 | Van Eeden |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0001729 A1 | 1/2008 | Kyllmann et al. |
| 2008/0024287 A1 | 1/2008 | Boyle et al. |
| 2008/0037458 A1 | 2/2008 | Myszne |
| 2008/0062880 A1 | 3/2008 | Yew et al. |
| 2008/0080447 A1 | 4/2008 | Grube et al. |
| 2008/0094198 A1 | 4/2008 | Yu |
| 2008/0100430 A1 | 5/2008 | Kochie et al. |
| 2008/0141766 A1 | 6/2008 | Roth et al. |
| 2008/0143593 A1 | 6/2008 | Graziano et al. |
| 2008/0157954 A1 | 7/2008 | Tsuchida |
| 2008/0165688 A1 | 7/2008 | Beshai et al. |
| 2008/0173082 A1 | 7/2008 | Hettle et al. |
| 2008/0177441 A1 | 7/2008 | Marlett et al. |
| 2008/0204217 A1 | 8/2008 | Costello et al. |
| 2008/0205553 A1 | 8/2008 | Costello et al. |
| 2008/0211672 A1 | 9/2008 | Pei |
| 2008/0240283 A1 | 10/2008 | Iwamura |
| 2008/0256260 A1 | 10/2008 | Magnusson et al. |
| 2008/0282965 A1 | 11/2008 | Crano |
| 2008/0285507 A1 | 11/2008 | Mukherjee et al. |
| 2008/0320243 A1 | 12/2008 | Mitsuzuka et al. |
| 2009/0021362 A1 | 1/2009 | Kochie |
| 2009/0033478 A1 | 2/2009 | Deniau et al. |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1 | 4/2009 | Shafer |
| 2009/0109012 A1 | 4/2009 | Petrucelli |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0224901 A1 | 9/2009 | Yu |
| 2009/0231114 A1* | 9/2009 | Yu .................. B60C 23/0408 340/447 |
| 2009/0245803 A1 | 10/2009 | Garner et al. |
| 2009/0267751 A1 | 10/2009 | Kaleal |
| 2009/0291710 A1 | 11/2009 | Jheng et al. |
| 2009/0310477 A1 | 12/2009 | Lee et al. |
| 2010/0071453 A1 | 3/2010 | Isono |
| 2010/0308987 A1 | 12/2010 | Haas et al. |
| 2011/0140876 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0001745 A1 | 1/2012 | Li |
| 2012/0117788 A1 | 5/2012 | Deniau |
| 2012/0119895 A1 | 5/2012 | Deniau |
| 2012/0139751 A1 | 6/2012 | Lin |
| 2012/0147184 A1 | 6/2012 | Siann et al. |
| 2012/0185110 A1 | 7/2012 | Deniau et al. |
| 2012/0274461 A1 | 11/2012 | Colombo et al. |
| 2013/0038443 A1* | 2/2013 | Deniau ............... B60C 23/0462 340/447 |
| 2013/0282231 A1 | 10/2013 | Farr et al. |
| 2014/0002258 A1* | 1/2014 | Chen .................. B60C 23/0455 340/447 |
| 2014/0139332 A1 | 5/2014 | Mouchet |
| 2015/0015389 A1 | 1/2015 | McIntyre et al. |
| 2015/0015390 A1 | 1/2015 | McIntyre et al. |
| 2016/0303925 A1* | 10/2016 | Liu .................... B60C 23/0462 |

FOREIGN PATENT DOCUMENTS

| | | |
|---|---|---|
| DE | 4492128 | 6/1996 |
| DE | 19503756 | 8/1996 |
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| DE | 102008033051 | 2/2010 |
| EP | 793579 | 9/1997 |
| EP | 1013483 A2 | 6/2000 |
| EP | 1026016 | 8/2000 |
| EP | 1291230 | 3/2003 |
| EP | 1428694 A2 | 12/2003 |
| EP | 1440824 A2 | 7/2004 |
| EP | 1494877 | 1/2005 |
| EP | 1536392 A1 | 6/2005 |
| EP | 1547827 | 6/2005 |
| EP | 1562162 | 8/2005 |
| EP | 1026015 | 5/2006 |
| EP | 1674299 A2 | 6/2006 |
| EP | 1352763 | 4/2008 |
| EP | 1340629 | 6/2008 |
| GB | 2387032 | 10/2003 |
| GB | 2420415 | 5/2006 |
| GB | 2500697 A | 10/2013 |
| JP | 62003537 | 1/1987 |
| JP | 63090407 A | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2001312860 A | 9/2001 |
| JP | 2002064404 A | 2/2002 |
| JP | 2003025817 | 1/2003 |
| JP | 2003-312220 | 11/2003 |
| JP | 2004-145474 | 5/2004 |
| JP | 2005289116 | 10/2005 |
| JP | 2006015832 | 1/2006 |
| JP | 2007010427 A | 1/2007 |
| JP | 2007200081 | 8/2007 |
| JP | 2007283816 | 11/2007 |
| JP | 2008137585 | 6/2008 |
| JP | 4265448 B2 | 2/2009 |
| JP | 5502729 B2 | 5/2014 |
| KR | 2003068216 | 8/2003 |
| KR | 1020070040883 A | 4/2007 |
| KR | 10-2009-0091001 | 8/2009 |
| RU | 38461 U1 | 6/2004 |
| RU | 2238190 | 10/2004 |
| RU | 2398680 C2 | 6/2006 |
| RU | 2409480 C2 | 7/2006 |
| RU | 2352473 C1 | 4/2009 |
| WO | 9420317 | 9/1994 |
| WO | 9422693 | 10/1994 |
| WO | 9908887 | 2/1999 |
| WO | 0072463 | 11/2000 |
| WO | 0145967 | 6/2001 |
| WO | 02094588 | 11/2002 |
| WO | 2003016079 | 2/2003 |
| WO | 2004038674 | 5/2004 |
| WO | 2005085651 | 9/2005 |
| WO | 2005116603 | 12/2005 |
| WO | 2007/006871 A1 | 1/2007 |
| WO | 2009006518 | 1/2008 |
| WO | 2008-103973 A1 | 8/2008 |
| WO | 2008106387 | 9/2008 |
| WO | 2008107430 | 9/2008 |
| WO | 2012/097154 A1 | 7/2012 |
| WO | 2013063061 A1 | 5/2013 |

(56) References Cited

FOREIGN PATENT DOCUMENTS

| WO | 2013/152294 A1 | 10/2013 |
|---|---|---|
| WO | 2015/015692 A1 | 2/2015 |

OTHER PUBLICATIONS

"Philips Magnavox 4 Function with Back Lighted Keypad Universal Remote" Operating Instructions, printed Oct. 2012, Philips Electronics North America Corporation.
"RadioShack 8-In-One Touch Screen Remote Control", Owner's Manual, 2001, RadioShack Corporation.
Kais Mnif, "A Smart Tire Pressure Monitoring System", Sensors Magazine, Nov. 1, 2001.
International Search Report and Written Opinion dated Sep. 28, 2012, from corresponding International Patent Application No. PCT/US2011/047112.
International Search Report dated Apr. 6, 2012, from corresponding International Patent Application No. PCT/US2011/047087.
International Search Report and Written Opinion dated Oct. 15, 2008, for Application No. PCT/US2008/069006.
International Preliminary Report on Patentability dated Jan. 14, 2010, for Application No. PCT/US2008/069006.
Chinese Office Action dated Apr. 19, 2011, for Chinese Application 200880023390.7 (Corresponding to PCT/US2008/069006).
Chinese Office Action (second) dated Feb. 16, 2012, for Chinese Application 200880023390.7 (Corresponding to PCT/US2008/069006).
Chinese Office Action (third) dated Oct. 10, 2012, for Chinese Application 200880023390.7 (Corresponding to PCT/US2008/069006).
Japanese Office Action dated Jun. 7, 2012, for JP Application 2010-515252 (Corresponding to PCT/US2008/069006).
International Search Report and Written Opinion dated Sep. 28, 2012, from corresponding International Patent Application No. PCT/US2011/047104.
Germany Office Action dated Nov. 19, 2012.
Germany Office Action dated Sep. 17, 2007.
Preliminary Invalidity Contentions of Defendant Continental Automotive Systems US, Inc.; dated Jan. 17, 2012, , In the United States District Court for Western District of Virginia Lynchburg Division, Civil Action No. 6:11-CV-00014-NKM.
Amended Invalidity Contentions of Defendant Continental Automotive Systems US, Inc.; dated Jun. 18, 2012, , In the United States District Court for Eastern District of Michigan Southern Division, Civil Action No. 2:12-cv-10715-SJM-MJH.
Plaintiffs' Initial Infringement Contentions; dated Dec. 15, 2011, In The United States District Court for Western District of Virginia Lynchburg Division, Civil Action No. 6:11-CV-00014-NKM-RSB.
Joint Claim Construction and Prehearing Statement, dated Jun. 11, 2012, from co-pending litigation: *Schrader-Bridgeport Int'l, Inc. v. Continental Automotive Sys, US, Inc.*, case docket No. 2:12-cv-10715-SJM-MJH, (filed Feb. 16, 2012, E.D. Mich.).
Plaintiffs' Opening Claim Construction Brief, dated Jun. 26, 2012, from co-pending litigation: *Schrader-Bridgeport Int'l, Inc. v. Continental Automotive Sys. US, Inc.*, case docket No. 2:12-cv-10715-SJM-MJH, (filed Feb. 16, 2012, E.D. Mich.).
USPTO Translation of JP2003025817A, translated from Japanese by Schreiber Translations, Inc., Feb. 2013.
Jeff Burgess, "TPMS Demonstration Kit", AN1943/D, Rev 1, Apr. 2002, Motorola, Inc., 2002 (16 pgs.).
Jeff Burgess, "Tire Pressure Monitoring System Reference Design", Tire Pressure Monitor System Demo, AN1951/D, Rev 1, May 2003, Motorola, Inc., 2003 (24 pgs.).
"Motorola's MPXY8000 Series Tire Pressure Monitoring Sensors", Motorola Sensor Products Division Transportation & Standard Products Group, Motorola, Inc., May 2003 (22 pgs.).
Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs.).
"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).
Search Report dated Aug. 20, 2015, from GB Patent Application No. GB1503824.3.
International Search Report and Written Opinion dated Sep. 28, 2012, from corresponding International Patent Application No. PCT/US2011/047108.
Search Report dated Jun. 20, 2014 , from EP Patent Application No. 11870613.4.
Search Report dated Jun. 30, 2014 , from EP Patent Application No. 11870701.7.
Search Report dated Mar. 24, 2015, from EP Patent Application No. 11870650.6.
Search Report dated Apr. 19, 2012, from International Patent Application No. PCT/US2012/021082.
Translation of Abstract of KR1020070040883A.
Machine Translation of RU2423246 C1.

* cited by examiner

APPARATUS, SYSTEM AND METHOD FOR CONFIGURING A TIRE INFORMATION SENSOR WITH A TRANSMISSION PROTOCOL BASED ON VEHICLE TRIGGER CHARACTERISTICS

CROSS REFERENCE TO RELATED APPLICATIONS

The following documents are considered to be related to the subject matter of this disclosure and are incorporated by reference herein in their entireties: U.S. patent application Ser. No. 13/206,336 entitled "Apparatus and Method for Activating a Localization Process for a Tire pressure Monitor;" now U.S. Pat. No. 9,024,743, U.S. application Ser. No. 13/206,314 entitled "Protocol Arrangement in a Tire Pressure Monitoring System;" now U.S. Pat. No. 8,576,060, U.S. application Ser. No. 13/206,358 entitled "Protocol Misinterpretation Avoidance Apparatus and Method for a Tire Pressure Monitoring System;" now U.S. Pat. No. 8,502,655, U.S. application Ser. No. 13/206,225 entitled "Tire Pressure Monitoring Apparatus and Method;" now U.S. Pat. No. 8,742,914, U.S. Pat. No. 8,692,661 entitled "Universal Tire Pressure Monitor Sensor;" U.S. Pat. No. 8,576,060 entitled "Protocol Arrangement in a Tier Pressure Monitoring System;" U.S. Pat. No. 7,243,535 entitled "Tire Monitoring System and Its Monitor Receiver, Monitor and Sensor," and U.S. Pat. No. 7,518,495 entitled, "Universal Tier Pressure Monitor."

TECHNICAL FIELD

The technical field relates to tire pressure monitoring devices that can operate using different message protocols.

BACKGROUND

Tire inflation pressure, tire temperature, tire age and tire rotational speed are known to be important to the safe operation of a motor vehicle. By way of example, a low tire pressure will reduce a vehicle's fuel efficiency, shorten tire life but more importantly a low tire pressure can cause a tire to fail.

Monitoring tire pressure is an inconvenience. Consequently, automatic tire pressure monitoring systems have been devised and most of these systems free the user from having to manually test a tire's inflation pressure.

Known automatic tire pressure sensing (TPS) devices are typically mounted within a tire that is mounted onto a wheel. The TPS device includes a pressure sensor, which provides signals that indicate or which correspond to a pressure inside the tire. The TPS wirelessly transmits such sensor information, using a protocol corresponding to, or required by a receiver within or coupled to the vehicle. Once the receiver receives the tire operating condition information, the information is presented on an instrument panel (IP) and thus provides a real-time or near real-time indication of actual tire conditions.

Inasmuch as tire pressure information is provided to an instrument panel and thus "incorporated" into or with other vehicle information, tire operating condition information is sent by a TPS device to a vehicle using radio frequency (RF) band signals, the format and transmission repetition rate of which is defined or specified by a vehicle's manufacturer. Each manufacturer typically uses its own unique, preferred, and pre-defined communications protocol in order to meet its own needs. Stated another way, the transmitters and receivers attached to a vehicle which send information to and receive information from a TPS device in a tire require the TPS device to use the manufacturer's TPS communication protocol. A tire pressure monitor device capable of operating with different communication protocols of different manufacturers, as well as different communication protocols used by the same manufacturer would reduce the number of different TPS devices that TPS manufacturers and servicers would have to provide and would thus be an improvement over the prior art.

DETAILED DESCRIPTION

Figure 1:
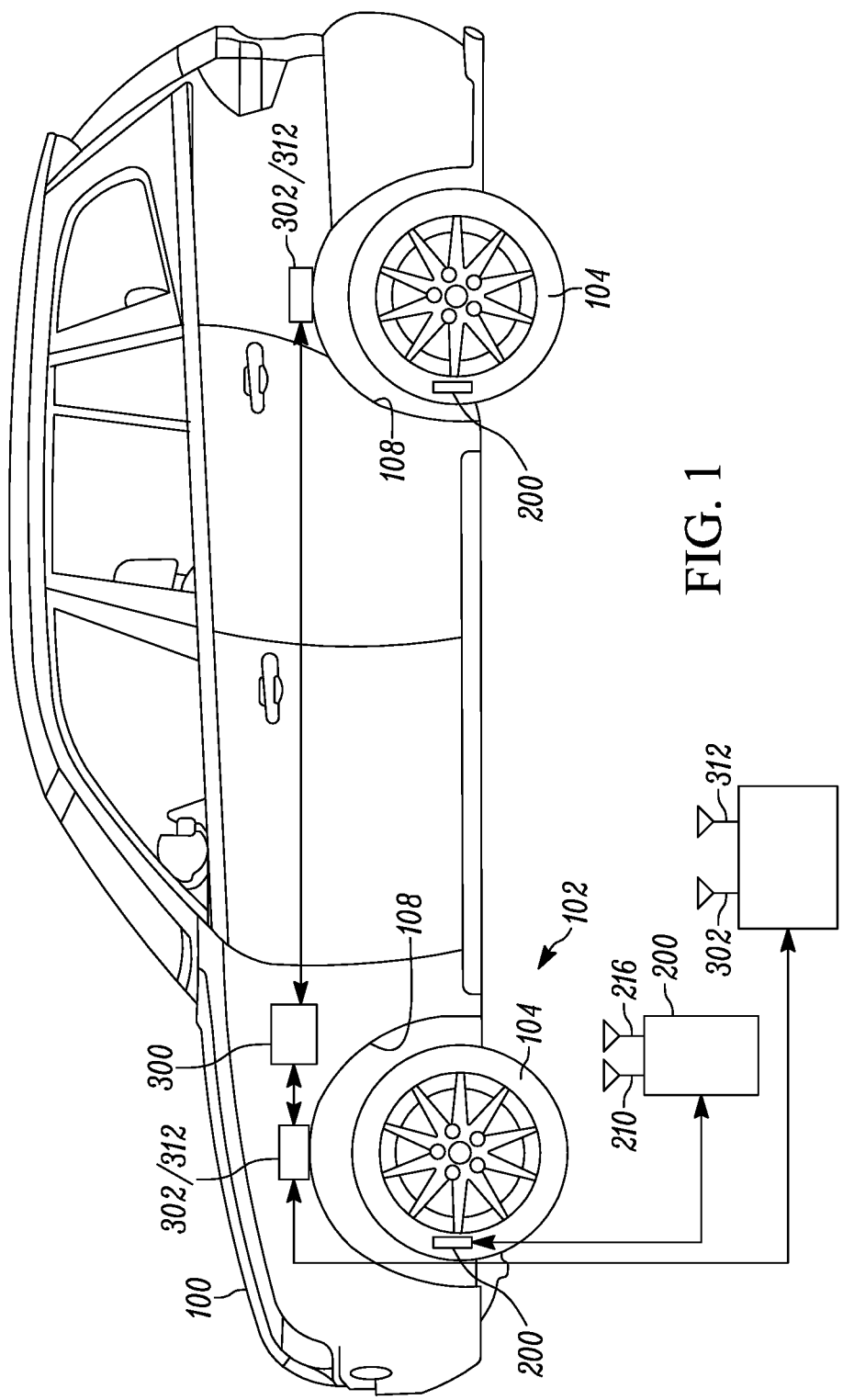
FIG. 1 is a block diagram of a tire pressure monitoring system.

FIG. 1 depicts a motor vehicle 100 with a tire pressure monitoring system 102. The system 102 comprises at least one battery-powered tire pressure sensor 200, described hereinafter, located inside each tire 104. The system also comprises a tire pressure montor 300, which is attached to or located in the vehicle 100.

Signals are sent to the tire pressure sensor 200 using low power, low frequency "LF" signals, which are themselves known in the art. Signals are sent from the tire pressure sensor 200 to the monitor 300 using low power radio frequency or "RF" signals, which are themselves also known in the art.

As described below, each sensor 200 has an LF antenna 210 by which the sensor 200 can receive LF signals. Each wheel well 108 is provided with an LF antenna 302, which is thus "proximate" to the tire pressure sensor 200 for each tire 104 and the LF antenna for the sensor. The LF antennas on the sensor and in the wheel well enable information-bearing wireless signals to be sent to the sensors 200 from the monitor 300. As described hereinafter, the monitor 300 selectively communicates wirelessly with the tire pressure sensors 200 one-at-a-time or at the same time, i.e., concurrently, using at least one of two, different wireless communication protocols or methods described below.

Unlike prior art tire pressure monitoring systems, including those described in the prior art documents incorporated by reference, the battery powered tire pressure 200 described herein enables one single "type" of tire pressure sensor 200 to be usable with virtually any type of motor vehicle. Stated another way, the tire pressure sensor 200 is a "universal" sensor, usable with different vehicles made by different vehicle manufacturers, having a tire pressure monitor 300.

When tire pressure sensors are first installed onto a vehicle, they typically determine the type of vehicle they are installed on, and the communications protocols to use, by analyzing LF signals received from a service tool or an activation device, such as the activation device 120 disclosed in Applicant's U.S. Pat. No. 8,576,060. In order to provide a more general purpose tire pressure sensor, or if a service tool or an activation device are not available, when the tire pressure sensor 200 described herein is first installed or first configured for use with a vehicle, the sensor 200 "listens" for a low-frequency (LF) signal from a vehicle's tire pressure monitor 300. By analyzing LF signals received from the vehicle's monitor 300, the pressure sensor 200 determines a particular message protocol used by the vehicle and hence the type of vehicle it is installed into. After the particular protocol is identified by the sensor 200, the sensor thereafter sends information to the monitor 300 as required by the manufacturer, preferably, but not necessarily, using only the particular communication protocol for the particular vehicle, and preferably but not necessarily, only as often as is required by the manufacturer of the particular vehicle.

The ability of the sensor 200 to work cooperatively with multiple vehicles is provided to the sensor 200, by program instructions for a processor in the sensor 200. Those instructions cause the LF receiver in the sensor 200 to "listen" for an LF message and determine from a received LF message how the LF message was formatted, encoded or modulated, i.e., which protocol of several different possible protocols were used to form the LF message. And, since some LF message formats include or are determined by values or symbols in one or more fields of an LF message itself, determining a format, protocol or "modulation" can include analyses of message field contents. For the sake of clarity, the terms form, format, encode and modulate are used interchangeably and should be construed as possibly including values in one or more message fields.

Since most vehicle manufacturers use proprietary encoding or modulation, the determination of an encoding or modulation scheme from an LF message effectively identifies the particular type of vehicle that transmitted the LF message. Knowing the type of vehicle that sent an LF message enables the sensor 200 to respond with an RF message that is modulated or encoded according to only the vehicle manufacturer's specifications and no other. The sensor 200 can thus be used with any vehicle that it is programmed to recognize; it does not use or require programming or re-programming nor does it require switches or programming devices to change its operation.

In a preferred embodiment, the sensor 200 transmits tire condition information only as it is required by a vehicle's manufacture and thereby avoids transmitting the same tire information over and over using multiple different formats or protocols as do prior art tire pressure sensors. In an alternate embodiment, however, some information that might not be needed can nevertheless be transmitted. By way of example, if two types of LF messages are received, such as an LF type A and LF type B then the processor can end RF messages for both vehicle type A and vehicle type B. Such an arrangement allows the sensor 200 to meet F.C.C. transmission requirements while keeping the amount of software at a reasonable level.

The ability to recognize multiple different communication protocols used by multiple different manufactures and therefore send information using preferably only one protocol, and preferable only as often as needed or required by a vehicle's manufacturer significantly reduces the length of a transmission from the sensor 200. Reducing the length or duration of a message sent by the sensor 200 significantly increases battery life.

For clarity as well as claim construction, as used herein a "tire" is considered to be the generally annular-shaped, relatively soft or flexible cushion that fits around a wheel and which normally contains compressed air. A "wheel" is a circular frame of hard material, e.g., aluminum or steel, that may be solid, partly solid, or spoked, but which is capable of being attached to and turning on an axle and on which a tire is mounted.

A "tire pressure sensor" is considered to be a device capable of being attached to a tire or located inside a tire or attached to or located inside wheel. It obtains tire operating characteristics and information from one or more sensors or transducers. Such information includes but not limited to inflation pressure, internal or external temperature, rotational speed and acceleration.

A tire pressure sensor is of course also capable of obtaining and wirelessly transmitting such tire-related information in real time or nearly real time. A "tire pressure sensor" does not necessarily include or require either a wheel, a tire or a wheel-tire assembly nor does it require a vehicle or tire pressure monitor 300.

As used herein, "tire-located" should be construed to be mean, located on or inside a tire or, attached to or inside a vehicle wheel to which a tire is mounted such that characteristics of the tire on the wheel can be sensed.

"Real time" means the actual time during which something takes place.

In a preferred embodiment of the system 102 shown in FIG. 1, at least one tire pressure sensor device 200 is located within each tire 104 of the vehicle 102. As is known in the art, tire pressure sensors communicate with a vehicle's tire pressure monitoring system or "receiver" using both LF and RF signals. Information is sent by the vehicle to a sensor using LF signals; information is received by the vehicle from a sensor using "RF" signals.

Figure 2:
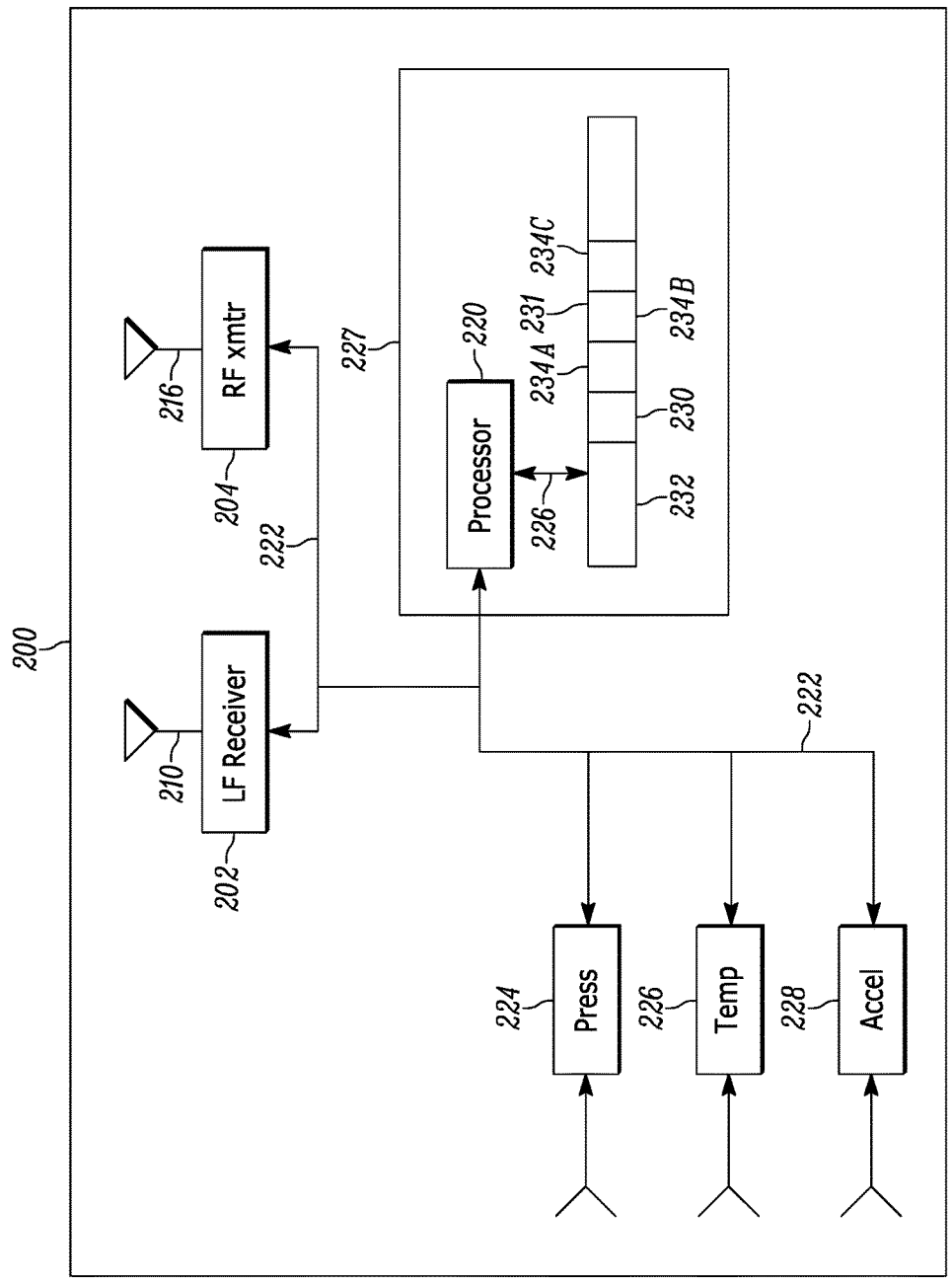
FIG. 2 is a block diagram of a tire pressure sensor.

Referring now to FIG. 2, a preferred embodiment of a tire pressure sensor 200 comprises an LF receiver 202 and an RF transmitter 204. For simplicity and brevity, the LF receiver 202 and RF transmitter 204 are depicted as having their own corresponding antennas 210 and 216.

The LF receiver 202 is configured to be able to receive relatively low-frequency, low-power and thus short-range signals through the conventional LF antenna 210. Such LF signals and antennas are well known: they have short propagation distances but which are nevertheless great enough to traverse the distance between the LF antenna 210 and an LF antenna 302 in a vehicle's wheel well.

The nominal frequency of the LF signals is typically about one-hundred-twenty-five kilohertz (125 kHz). Information on the LF signal is preferably provided by amplitude modulating (AM) the 125 kHz. signal. Such LF signals are thus considered to be in a first frequency band, i.e., a first portion of the electromagnetic spectrum.

The RF transmitter 204 portion of the sensor 200 transmits low power-level signals from the RF signal antenna 216 for the sensor 200 at a much higher frequency, i.e., about 315 Mhz., which is a distinctly different portion of the electromagnetic spectrum and hence in a different band, i.e., the radio frequency band. The RF transmitter 204 is thus considered herein as operating in a second, different frequency band. Information can be carried on the RF signals using any one of a variety of different modulation techniques, e.g., FM, AM, FSK, PSK, all of which are well known to those of ordinary skill in the communications art.

Still referring to FIG. 2, the LF receiver 202 and RF transmitter 204 are both coupled to a conventional processor 220, preferably a microcontroller with its own on-board memory, through a conventional bus 222, which is a set of electrically-parallel conductors in an electronic system that form a main transmission path between various components of the system. Using the bus 222, the processor 220 is able to send data and control signals to one or both the LF receiver 202 and RF transmitter 204. The processor 220 also receives data and information from the LF receiver 202 and RF transmitter 204. The processor 220, LF receiver 202 and RF transmitter 204 are thus considered to be coupled to each other through the bus 222.

As used herein, a "sensor" is a device that responds to a physical stimulus such as pressure, heat and acceleration, and which generates an electrical signal representing the stimulus. In FIG. 2, the processor 220 is coupled to one or more sensors 224, 226, 228 through the bus 222. In a preferred embodiment, at least one sensor coupled to the processor 220 is a pressure sensor. It outputs an electrical signal to the processor via the bus 222 or another conductor, not shown, which is proportional to, or representative of, a tire's inflation pressure. In other embodiments, the sensors 224, 226 and 228 can include a pressure sensor, a temperature sensor, an accelerometer and a timer, all of which can sense an operating condition of a tire and are thus considered to be tire operating condition sensing devices.

As can be seen in FIG. 2, the sensors provide signals that represent corresponding tire conditions to the processor 220 via the bus 222. The signal representing tire operating conditions are provided by the processor 220 to the RF transmitter 204, which generates a radio frequency signal that is transmitted from the RF antenna 216. The sensor 200 thus transmits signals representing tire operating conditions by forming a message that is modulated onto a radio frequency carrier signal using a tire sensor information communications protocol.

Most vehicle manufacturers use their own protocols to send tire operating condition information from a tire sensor to a vehicle. The ability to modulate the various tire operating condition information onto an RF signal using different protocols is provided by program instructions 250 stored in the memory 230 for the sensor's processor.

The processor 220 for the sensor 200 provides "intelligence" to the sensor by controlling devices coupled to the bus 222. The control of those devices ir provided by executable program instructions that are stored in a memory device 230.

As shown in FIG. 2, the memory device 230 is coupled to the processor 220 by a second and different bus 226 because the memory device 230 and processor 220 are part of a microcontroller and thus typically co-located on the same semiconductor die 227. The memory device 230 is in any case a non-transitory storage device for a control program 232 that is located inside the memory device 230. The memory device 230 can, however, also store data sent to the processor 220 by the various peripheral devices that include the receiver 202, transmitter 204 and sensors.

Figure 3:
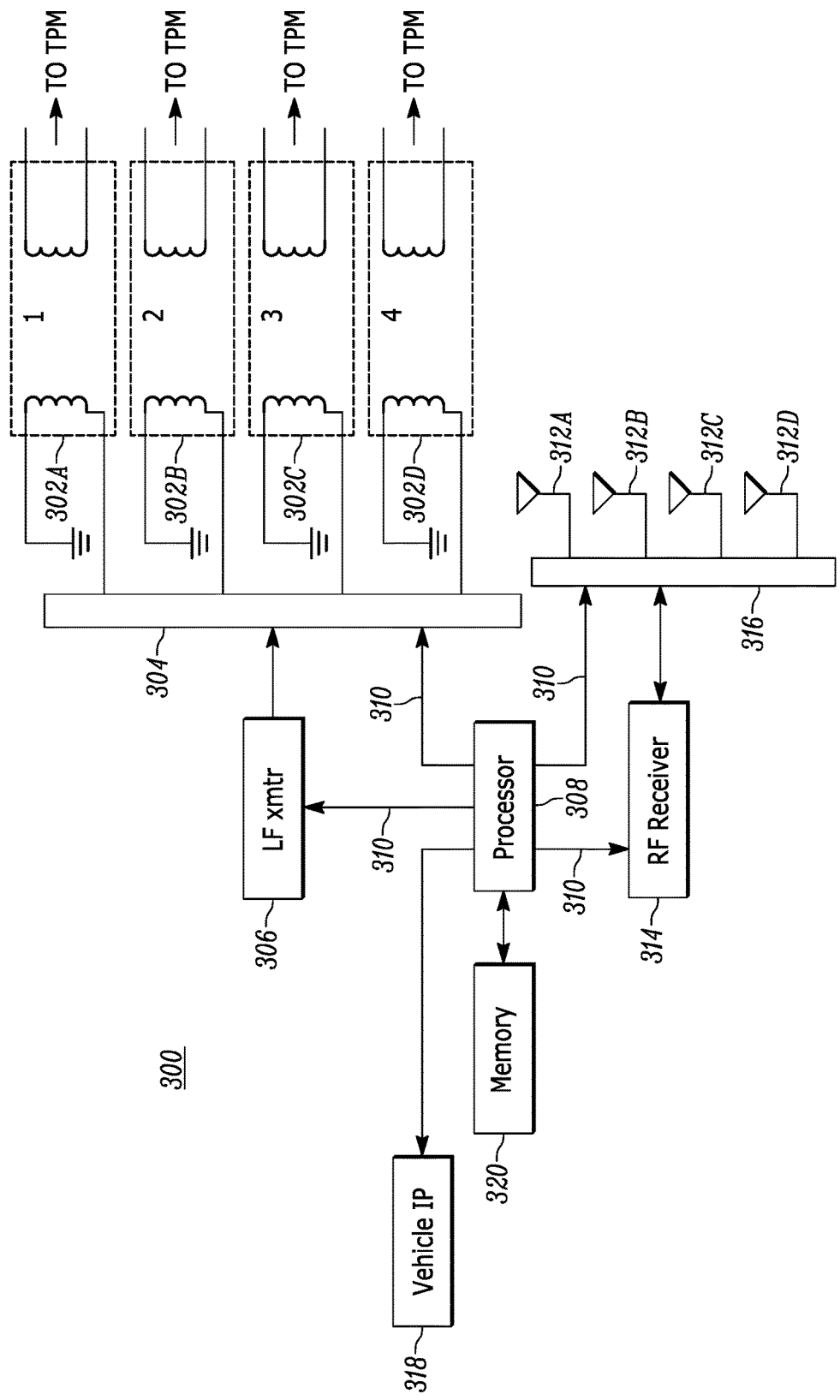
FIG. 3 is a block diagram of a monitor, which receives tire pressure sensor information from tire pressure sensors.

Referring now to FIG. 3, which is a block diagram of the tire pressure monitor 300, a conventional low frequency (LF) antenna is installed into each wheel well of a vehicle. Vehicle wheel wells are not shown in FIG. 3. Four LF antennae are shown in FIG. 3, one for each wheel well, and identified by reference numerals 302A-302D.

An antenna switch 304 is able to selectively couple one or more of the antennae 302 to an LF transmitter 306. The LF antenna switch 304 and the LF transmitter are both coupled to a processor 308 through a bus 310 and thus receive data and control instructions from the processor 308 via the bus 310.

The LF antennas 302A-302D are sized, shaped and arranged in the vehicle's wheel wells to inductively couple them to LF antennae for tire pressure sensors 200 also in a wheel well. A low frequency signal output from the LF transmitter 306 can thus be selectively provided to one antenna or multiple antenna by way of control signals provided to the antenna switch 304 by the processor 308. Information-bearing signals from the LF transmitter 306 can thus be wirelessly transferred from the monitor 300 to the tire pressure sensor 200 via LF antennae via the LF antennae 302A-302D and the antennae 210 for each tire pressure sensor 200. Selectively connecting or energizing the different wheel well antennae 302 enables the monitor 300 to selectively communicate with tire pressure sensors 200 one-at-a-time or in parallel.

Four RF antennae are identified by reference numerals 312A-312D, one being located inside each wheel well. A second antenna switch 316 selectively couples one or more of the antennae 312 to an RF receiver 314. The RF antenna switch 316 and the RF receiver 314 are both coupled to the processor 308 through the bus 310 and thus receive data and control instructions from the processor 308.

One or more memory devices 320 coupled to the processor 308 store executable instructions for the processor 308. The memory device(s) 320 can also store data, of course, such an identifier for the vehicle.

When the program instructions stored in the memory device(s) 320 are executed, the cause the processor 308 send control signals to the LF transmitter and RF receiver. Control signals sent to the LF transmitter cause it to generate various types of signals, which are formatted using a protocol specified by the vehicle's manufacturer.

The stored instructions also cause the processor 308 to receive information from the RF receiver, which can include tire pressure identifiers and tire operating condition data, such as an inflation pressure for each of the vehicle's tires.

Data that represents tire operating conditions, such as tire pressure, is provided by the processor 308 an instrument panel display 318, which is coupled to the processor.

The term "protocol" refers to rules that describe how to effecuate the transfer of data between devices. A protocol thus specifies the format of the data. A protocol also specifies the data signals that start, control and end the transfer set of data.

Examples of communication protocols that may be used with a tire pressure monitoring system include the frequency and timing of transmissions from a tire pressure sensor 200 to the monitor 300; the format of a transmission, such as what constitutes a "1" or a "0;" a modulation type, such as amplitude or frequency modulation, error detection and/or correction, a synchronization pattern, and so forth.

Figure 6A:
FIG. 6A-6C depict different protocols used to form a low frequency or "LF" message.
Figure 6B:
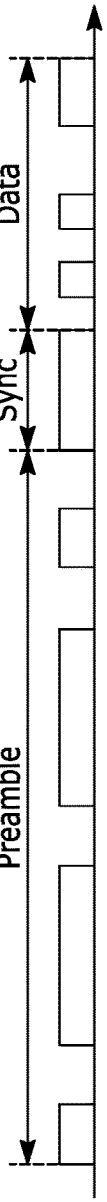
Figure 6C:

FIGS. 6A-6C depict the same LF message 600 formatted using three (3) different LF protocols. The LF messages are denominated as LF Command 1, LF Command 2 and LF Command 3.

Figure 6D:
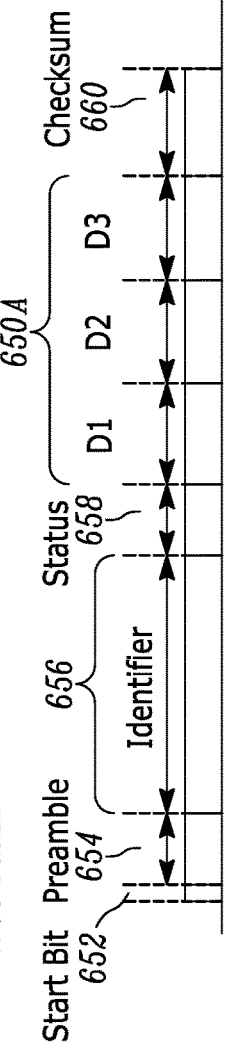
FIG. 6D-6F depict different protocols used to form a radio frequency or "RF" message.
Figure 6E:
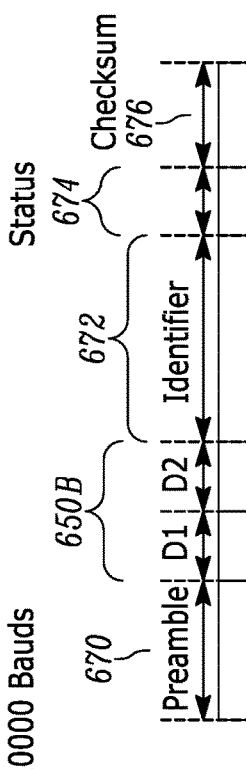
Figure 6F:
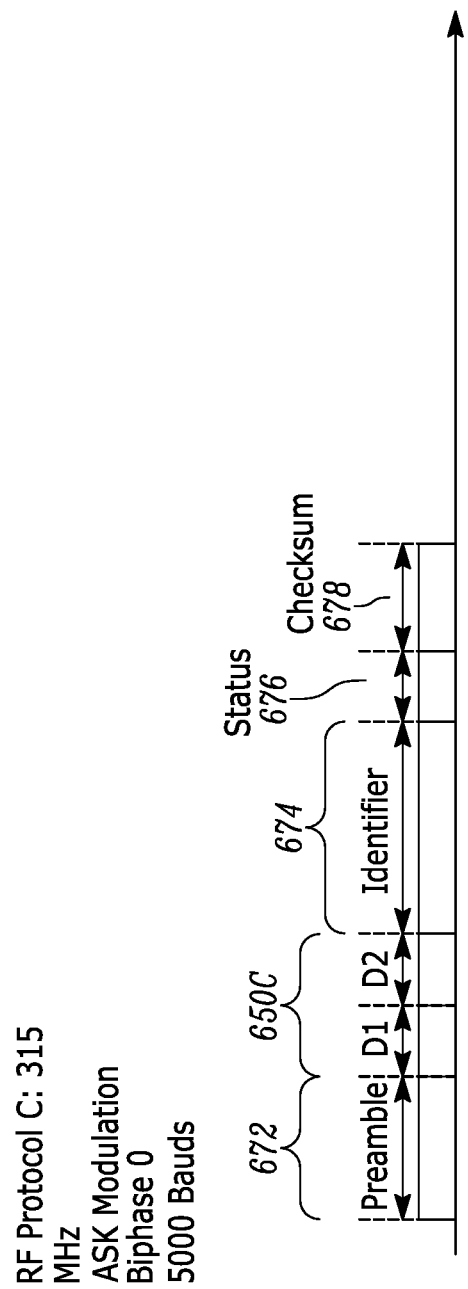

FIGS. 6D-6F depict the same RF message 650 formatted using three different RF protocols. The RF messages formatted with different protocols are denominated as RF protocol message A, RF Protocol message B and RF protocol message C.

In FIG. 6A, the first protocol requires message content 600A to be preceded by a synchronization segment 604 and an identifier or "ID" 606 of a particular sensor to which the message 600 is addressed. The data of the message is modulated using amplitude shift keying (ASK) and encoded using an inverted Manchester encoding. In FIG. 6B, the message 600B is ASK modulated but encoded using a biphase encoding. In FIG. 6C, the LF message 600C is modulated using ASK but preceded by a message preamble 614 and.

Referring now to FIG. 6D, an RF message 650A to be sent by the sensor 200 to a pressure monitor 300, is preceded by a start bit 652, a message preamble 654, a sensor identifier 656, a status field 658 and followed by a check sum 660. The message 650 is modulated using frequency shift keying (FSK), and biphase encoded.

In FIG. 6E, the same RF message is modulated using FSK but encoded using inverted Manchester encoding, The message 650B is preceded by a preamble 670 but followed by a sensor identifier 672, a status field 674 and a checksum 676.

In FIG. 6F, the RF message 650C is ASK modulated and biphase encoded. The message is preceded by a preamble 672 but followed by a sensor identifier 674, a status field 676 and a checksum 678.

Figure 7:
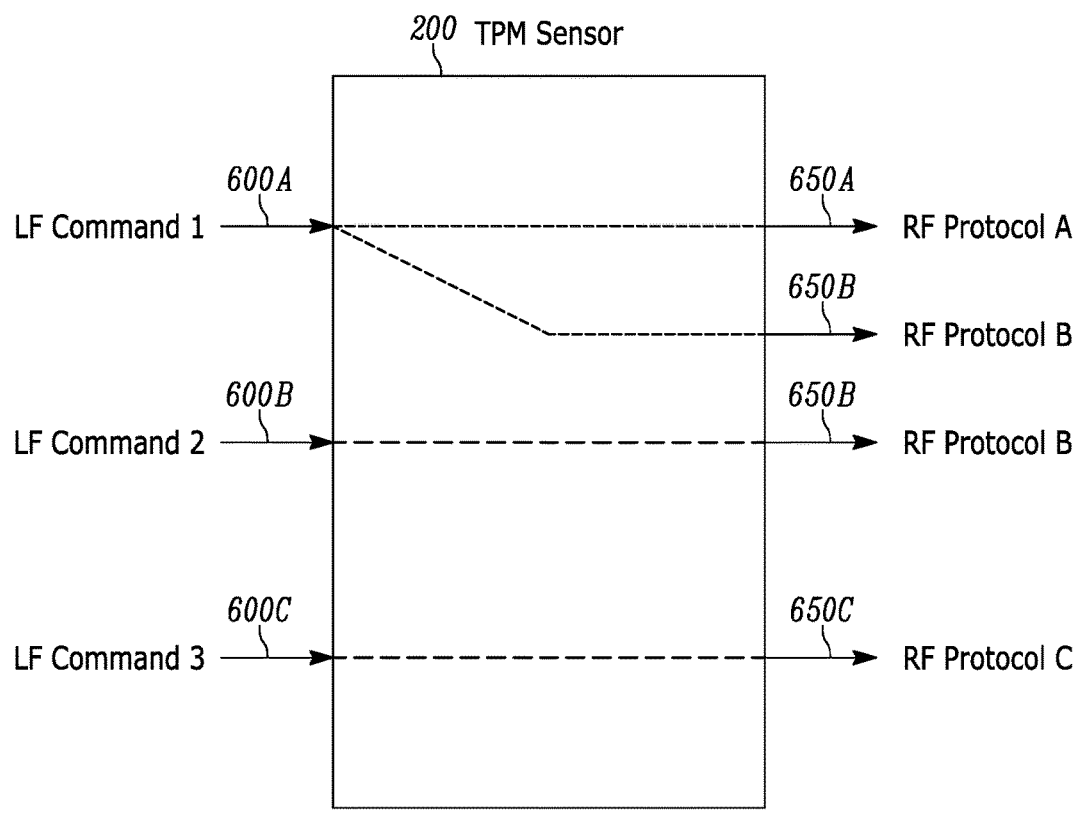
FIG. 7 depicts how reception of different LF message protocols by a sensor are responded to by sending RF messages formed using different RF message protocols.

FIG. 7 depicts how the sensor 200 shown in FIG. 2 receives LF messages formatted using various protocols and outputs an RF message that is formatted with a protocol selected using the LF message protocol. More particularly, in FIG. 7, the reception of the LF message 600A shown in FIG. 6A, causes the sensor 200 to subsequently transmit two RF messages, i.e, a first message 650A using both RF protocol A and a second message 650B.

Referring again to FIG. 2, the tire pressure sensor 200 is configured to work with virtually any type of vehicle tire pressure monitor 300 by programming the processor 220 for the sensor 200 to be able to receive an LF message, compare the received message to exemplars or samples of LF messages that were formatted using various manufacturers' protocols and from such a comparison identify a particular protocol that used to format or "modulate" the LF signal that was received from a vehicle tire pressure monitor 300. Stated another way, the sensor 200 is provided with the ability to "learn" an RF message protocol to use to send out messages to a vehicle by listening to an LF message that was sent from a vehicle 100. The sensor 200 is thus provided with the ability to identify from the LF message protocol, the type of RF message protocol that should be used to send tire information to the vehicle. Stated another way, the sensor 200 learns the RF message protocol required by the vehicle's manufacturer by analysis of the LF message protocol that it receives.

By executing various pre-determined instructions for the processor 220 that are stored in the memory device 230, an essentially unintelligible LF message received by the sensor 200, such as a message that "polls" a tire pressure sensor, is resolved by the processor 220 into component parts or "parsed." The components of the received LF message that can be matched with or correlated to corresponding or the same parts of the same type of message created using different types of protocols, and which are stored in the memory device 230 for the processor as reference LF messages 234A, 234B, enable a protocol that was used to modulate the received LF polling message to be unambiguously identified by the processor 220.

By way of example, an LF polling message received by the sensor 200 is compared to samples of polling messages 234 that were formatted or created using various different protocols used by a various different vehicle manufacturers, and which are stored in the memory device 230. A known good polling message formatted with a particular protocol and that matches a received LF polling message, effectively identifies the LF protocol that was used to format the received LF message. Known LF message protocols that are used by various manufacturers and which are stored in the memory device 230 as exemplars 234 are indexed in the memory device 230 to corresponding RF message protocols used by the same manufacturer. Identifying the LF message protocol thus identifies an RF message protocol to be used by the sensor 200 in order for it to conduct subsequent RF communications with the vehicle.

After a protocol used to create an LF is determined, subsequent RF communications sent to the vehicle by the sensor 200 are formatted by the processor 220 preferably, but not necessarily, using only the vehicle-appropriate protocol and preferably only as often as is required by vehicle's manufacturer, significantly reducing the number of unnecessary and battery-wasting transmissions. Unlike "generic" prior art tire pressure sensors, no tire pressure message needs to be repeated using other protocols; no switches or other devices are used to identify or input a communications protocol or enter types of protocols.

Figure 4:
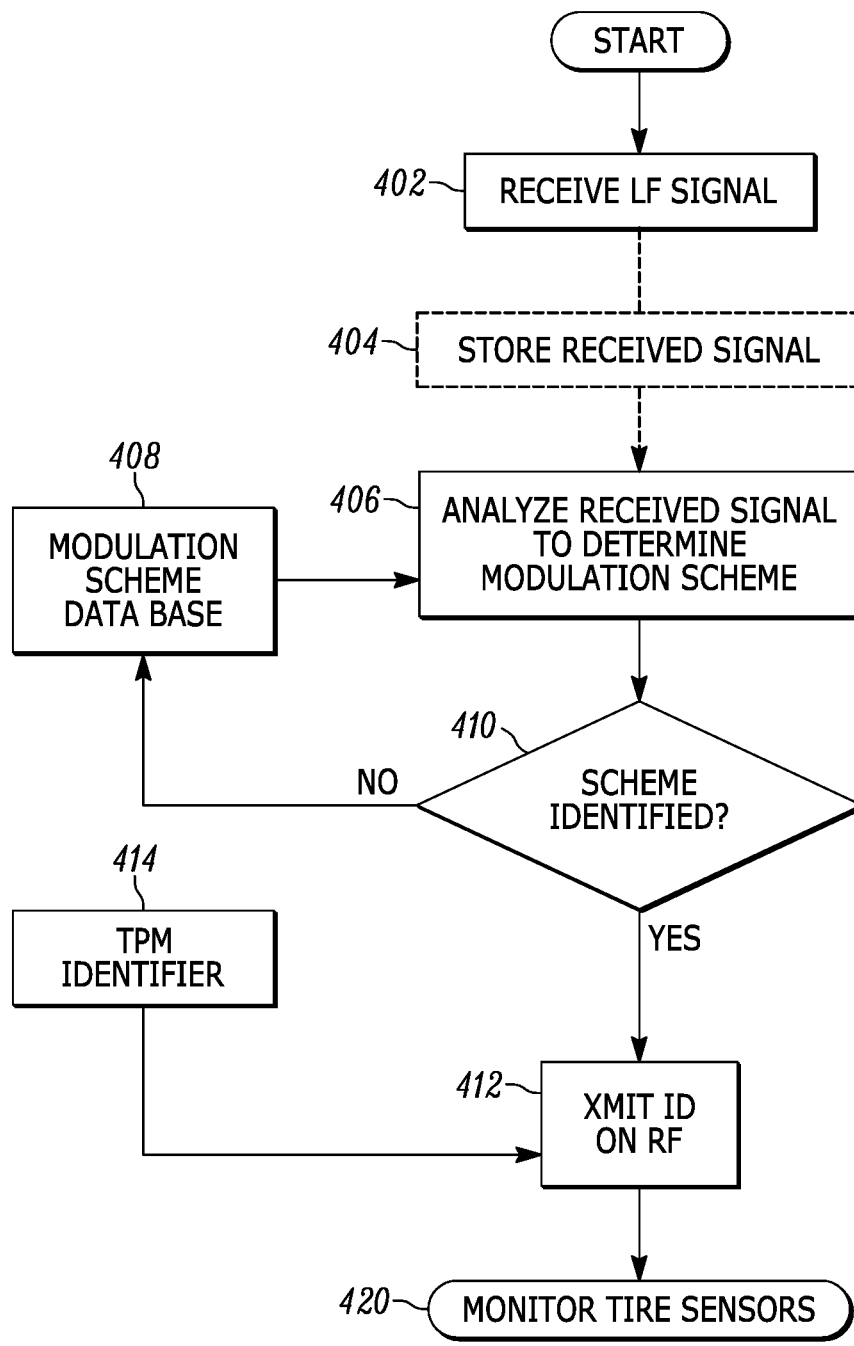
FIG. 4 is a flow chart depicting a method of determining a particular type of protocol used to format an LF message from a vehicle.

FIG. 4 depicts steps of a method 400 by which the non-specific or generic tire pressure sensor 200 depicted in FIG. 2 is autonomously configured, i.e. configured automatically by itself, for use with a particular type of vehicle, and which requires tire pressure information signals to be exchanged between the tire sensors and the vehicle, according to a particular manufacturer's communications protocol.

The first step 402 of the method 400 is of course the reception of an LF signal by the pressure sensor 200 at an LF receiver 202. As shown in FIG. 2, the LF receiver 202 is coupled to a processor 220 via a bus 222, which enables the processor to receive the LF signal from the receiver 202. In one alternate embodiment of the method 400, the received LF message is stored by the processor 220 at step 404 in one or more memory locations of the memory device 230.

At steps 406 and 408, a received LF message is parsed and its components analyzed to determine a particular protocol or "modulation scheme" by which the received LF message was created. Known good exemplars of LF messages that were created using various different protocols are stored in the sensor's memory device 230 as a database or list. Using any appropriate comparison technique, database entries are compared to the received LF message until a database entry is determined to match the received LF message. Stated another way, each database entry is compared to a received LF message until a database entry is determined to match the structure or protocol of the received LF message.

In the preferred embodiment, each database entry, i.e., each exemplar 234 stored in memory 230 is correlated to a particular type of protocol to be used to communicate with a particular type of vehicle. Once the protocol of a received LF message is determined from the database entries, the protocol to be used with subsequent communications for the same vehicle is obtained from the database. More particularly, an RF message protocol is obtained from or determined from the exemplars 234.

At step 410 and after an LF protocol has been identified, the method proceeds to step 412 where the sensor 200 generates and sends an identification message to the vehicle. In most pressure sensors, the first message sent by the sensor 200 is an "ID" or identification message includes a unique, numeric identifier for the sensor 200, i.e., a number that uniquely and unambiguously identifies the sensor 200 to the monitor 300. The sensor id 414 is preferably stored in the memory device 230 coupled to the processor 220 and for instrument panel display purposes, the ID enables the monitor 300 to track the pressure inside each tire regardless of the wheel well in which the tire is located.

After the sensor ID is sent, the sensor 200 is able to monitor tire conditions and report them to the monitor 300. Step 420 thus depicts tire conditions being monitored and reported to the monitor 300.

Figure 5:
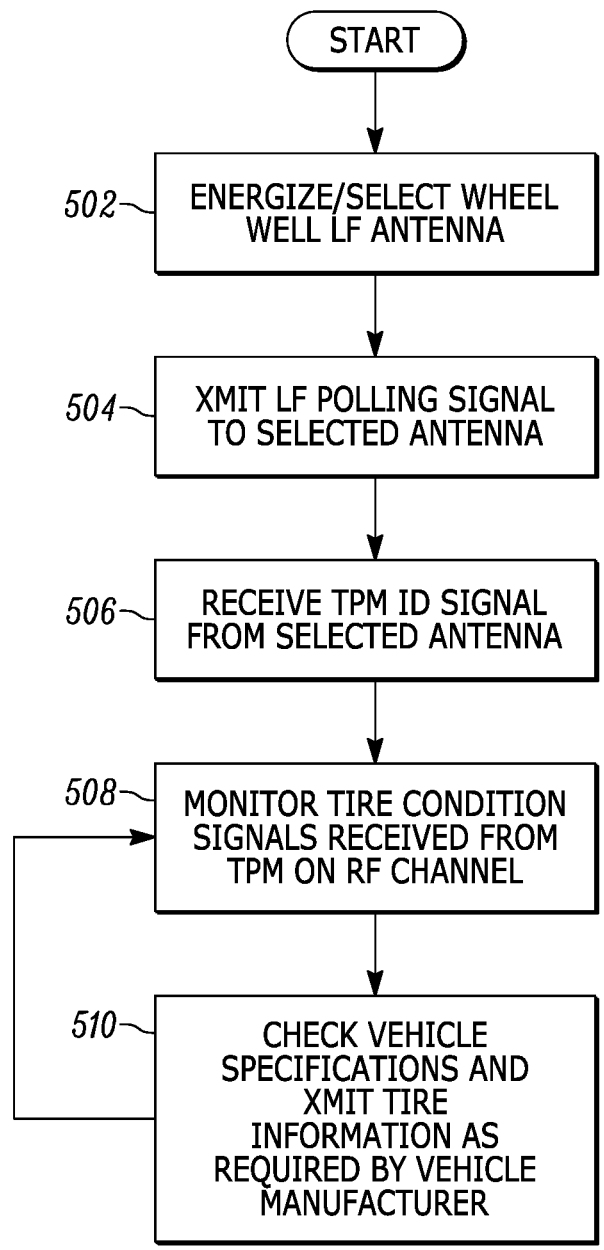
FIG. 5 is a flow chart depicting steps of a method for communicating to a sensor from a vehicle.

FIG. 5 depicts steps of a method by which the monitor 300 can initialize a sensor 200 or selectively communicate with each sensor on a vehicle using the vehicle's particular communications protocol. FIG. 5 also depicts a method of locating a particular sensor 200 at a particular vehicle wheel.

Referring first to FIG. 3, the tire pressure monitor 300 comprises an antenna switch 304, which can selectively connect the LF transmitter 306 to different LF antennae 302 under the control of the processor 308 in the monitor 300. In FIG. 5, at step 502 a particular LF antenna located inside a particular wheel well 302 is "energized" or connected to the LF transmitter by the processor for the monitor 300.

At step 504, a polling message is generated by an LF transmitter in the monitor 300 responsive to control signals sent to the LF transmitter by the processor and broadcast from the particular LF antenna to which the transmitter was connected by step 502. At step 506, and after the sensor 200 in the wheel well 302 having the energized antenna identifies the polling message protocol, an identifier (ID) for the sensor, which is transmitted by the sensor 200, is received at the sensor 300 as an RF message.

At steps 508 and 510, the located and identified sensor 200 is "in service" and reports tire pressure to the monitor 300 as required by the vehicle's manufacturer. Having learned the vehicle's RF message protocol, no extraneous messages are sent by the sensor 200 nor are such messages received by the monitor 300.

Finally, one embodiment of the sensor 200 is configured and arranged to be usable with vehicles having tire pressure monitoring systems but which do not transmit LF initialization signals. Some such vehicles "learn" a tire pressure sensor's RF transmission protocol from RF signals transmitted by the sensor. In such an embodiment of the sensor 200, program instructions for the processor 220 cause the processor to assume that the sensor 200 is installed on an auto-learn vehicle when an LF signal is not received within a predetermined amount of time. After the passage of a some pre-determined period of time, the sensor 200 autonomously transmits RF messages, using one or more protocols selected from the memory device 230. The protocol(s) of the transmitted RF message are thereafter adopted by the vehicle for subsequent use.

The foregoing description is for purposes of illustration only. The true scope of the invention is set forth in the following claims.

What is claimed is:

1. A tire pressure sensor for a motor vehicle having a tire pressure monitor, the tire pressure sensor comprising:
a non-Bluetooth wireless receiver located inside a vehicle tire, the non-Bluetooth wireless receiver being configured to:
receive from the vehicle tire pressure monitor, a first, non-Bluetooth low-frequency (LF) wireless message when the non-Bluetooth wireless receiver is inside the vehicle tire, the received first non-Bluetooth message being formed using one of a plurality of different types of first wireless message protocols;
while the non-Bluetooth wireless receiver is inside the tire, identify a particular type of wireless message protocol that was used to form the received first non-Bluetooth wireless message; and
generate a non-Bluetooth output message to a non-Bluetooth wireless transmitter co-located with the non-Bluetooth wireless receiver while the non-Bluetooth wireless receiver is inside the vehicle tire, the non-Bluetooth output message from the non-Bluetooth wireless receiver comprising an identifier, which identifies the non-Bluetooth wireless message protocol by which the received non-Bluetooth first wireless message was formed by the vehicle tire pressure monitor; and
a non-Bluetooth wireless transmitter co-located with the non-Bluetooth wireless receiver inside the vehicle tire, the non-Bluetooth wireless transmitter being coupled to the non-Bluetooth wireless receiver, and configured to transmit to the tire pressure monitor from inside the tire, a second, non-Bluetooth, high-frequency message containing tire information using a second non-Bluetooth wireless message protocol, which is selected in response the identifier for the tire pressure sensor;
wherein the reception of the first non-Bluetooth message by the non-Bluetooth wireless receiver, the identification of the first non-Bluetooth wireless message protocol by the non-Bluetooth wireless receiver and selection of the second non-Bluetooth wireless message protocol by the non-Bluetooth wireless receiver takes place inside the tire.

2. The tire pressure sensor of claim 1, wherein the non-Bluetooth wireless transmitter is configured to transmit the identifier to the vehicle tire pressure monitor autonomously.

3. The tire pressure sensor of claim 1, further comprising a tire operating condition sensing device operatively coupled to the non-Bluetooth wireless transmitter, the tire operating condition sensing device providing signals that represent an operating condition of a tire, wherein the non-Bluetooth wireless transmitter is configured to receive information from the operating condition sensing device and to transmit the information on a radio frequency (RF) signal, which is formed using a non-Bluetooth message protocol identified by said first non-Bluetooth wireless message from the non-Bluetooth wireless receiver.

4. The tire pressure sensor of claim 3, wherein the non-Bluetooth wireless transmitter transmits the operating condition information on a second radio frequency band, using the protocol identified by the non-Bluetooth wireless receiver and only as often as is required by a manufacturer of the vehicle.

5. The tire pressure sensor of claim 1, wherein the non-Bluetooth wireless receiver is additionally configured to receive a second non-Bluetooth wireless signal, which is formed using one of a plurality of different types of protocols and upon receipt of said second wireless signal, initialize said non-Bluetooth wireless transmitter.

6. The tire pressure sensor of claim 1, wherein the non-Bluetooth wireless receiver is a non-Bluetooth low-frequency, short-range wireless signal receiver, the first wireless signal is a short-range, low-frequency signal and wherein the non-Bluetooth wireless transmitter is a high-frequency radio frequency transmitter.

* * * * *